United States Patent [19]

Saito et al.

[11] Patent Number: 4,767,079
[45] Date of Patent: Aug. 30, 1988

[54] ROLL FILM CARRIER FOR READER OR READER PRINTER

[75] Inventors: Takanori Saito, Kawasaki; Osami Kato, Sagamihara, both of Japan

[73] Assignee: Minolta Camera Kabushiki Kaisha, Osaka, Japan

[21] Appl. No.: 848,137

[22] Filed: Apr. 4, 1986

[30] Foreign Application Priority Data

| Apr. 5, 1985 | [JP] | Japan | 60-73274 |
| Apr. 10, 1985 | [JP] | Japan | 60-76096 |
| Jun. 10, 1985 | [JP] | Japan | 60-125750 |
| Jun. 10, 1985 | [JP] | Japan | 60-125751 |

[51] Int. Cl.⁴ .............. G11B 15/32; G11B 23/04; G03B 1/04
[52] U.S. Cl. .................. 242/197; 242/68.3; 242/192; 242/200; 242/201; 352/72; 352/73; 352/157
[58] Field of Search .......... 242/192, 197–207, 242/68.3; 352/72–74, 78 R, 157, 78 C; 360/94

[56] References Cited

U.S. PATENT DOCUMENTS

| 3,468,498 | 9/1969 | Bunting | 242/207 |
| 3,526,406 | 9/1970 | Blackie et al. | 242/197 X |
| 3,531,192 | 9/1970 | Etter | 352/72 |
| 3,603,529 | 9/1971 | Bundschuh | 242/197 |
| 3,656,703 | 4/1972 | Vockenhuber et al. | 242/197 X |
| 3,669,383 | 6/1972 | Kadowaki | 352/73 X |
| 3,734,427 | 5/1973 | Palmer | 242/197 |
| 3,744,889 | 7/1973 | Wilsch et al. | 352/72 |
| 3,750,976 | 8/1973 | Bundschuh et al. | 242/192 |
| 3,813,056 | 5/1974 | Hagen et al. | 242/197 |
| 3,908,930 | 9/1975 | Gresens | 242/197 |
| 3,918,802 | 11/1975 | Sakaguchi et al. | 352/72 |

*Primary Examiner*—John Petrakes
*Attorney, Agent, or Firm*—Burns, Doane, Swecker & Mathis

[57] ABSTRACT

In a roll film carrier for a reader or a reader printer according to the invention, a first type film cassette and a second type film cassette being different from each other in connection system between a drive source and an enclosing reel within a cartridge can be installed detachably. The roll film carrier comprises a first reel drive shaft to drive an enlosing reel within a first type film cartridge and a second type reel drive shaft to drive an enclosing reel within a second type film cartridge, and selectively connects the reel drive shafts corresponding to type of the cartridge thereby cartridges of different types can be used.

7 Claims, 9 Drawing Sheets

ROLL FILM CARRIER FOR READER OR READER PRINTER

BACKGROUND OF THE INVENTION

The present invention relates to a roll film transfer apparatus, and more particularly to a roll film transfer apparatus which automatically feeds a roll film wound on a supply reel and automatically winds it onto a take up reel. For example, the invention is utilized in a roll film carrier for a reader or a reader printer, which retrieves a prescribed frame of a roll microfilm and projects it on a screen for viewing or selectively performs the viewing and the printing.

Roll microfilms are broadly classified at present into a film $F_1$ enclosed in a cartridge A of M type of 3M (Minesota Mining & Manufacturing) in U.S.A. as shown in FIG. 1 and a film $F_2$ enclosed in a cartridge B of standard type of ANSI (American National Standards Institute, Inc.) as shown in FIG. 2.

The cartridges A and B of these types are different, on the basis of their own structure, in the connection structure of an internally enclosed reel $a_1$ or $b_1$ to a drive shaft and also in the feeding-out system of the roll film $F_1$ or $F_2$ wound on each reel $a_1$ or $b_1$.

Consequently, in the prior art, exclusive machines corresponding to respective types were required to be used, or the exchange of some parts of a roll film carrier was necessary to enable use in the other type of machine. However, use of the exclusive machines is disadvantageous in that both type cartridges are not compatible. On the other hand, although the use of the cartridges of different types by exchange of parts eliminates the above disadvantages in the exclusive machines, a troublesome work is required to exchange a reel drive shaft for driving a reel and further a roll film leading end feed mechanism.

Aside from the differences resulting from the structure of the cartridges themselves, the films $F_1$ and $F_2$ are different from each other in the feeding-out system wherein the former film $F_1$ is provided with a leader tape T of large width and strong material at its leading end. Explaining the difference of the width specifically, in the film of 16 mm, for example, the leader tape T of 20.5 mm is used. Consequently, a difference regarding whether the leader tape T exists or not produces a difference of width of 16 mm and 20.5 mm in the leading end of the films $F_1$ and $F_2$.

Usually, in a roll film carrier, frame retrieval marks (document marks) provided adjacent to each frame on the films $F_1$, $F_2$ are read to perform the retrieval. In order to read the document marks accurately without meandering of the films $F_1$, $F_2$, width of a film feed path between a supply reel and a take-up reel must fit to that of the film $F_1$, $F_2$. To meet such requirement, parallelly installed exclusive transfer paths suitable for respective films may be selectively used, or otherwise the exclusive transfer path or its film width direction positioning member may be exchanged and used. However, in the selective use system of the parallelly installed transfer paths, the transfer paths are much complicated. In the exchange use system of the transfer path or its parts, burden is required to gather the parts and also the exchange work is troublesome and may produce troubles such as forgetting of exchange, mistake of exchange or loss of the exchange parts. Furthermore, storage of the parts is required.

Regarding the film winding onto the take-up reel, for both the films $F_1$ and $F_2$, the film winding is performed while the film leading end advancing to the film take up mechanism is hooked to a film winding pawl at an inside surface of a flange on both ends of a take-up shaft of the take-up reel. In the case of the film of M type with the film leading end formed by the strong leader tape T, the film has a good straight advancing property on its leading end which in turn causes the film leading end to lack in the approaching property to the take-up shaft of the take-up reel so that the film is not wound securely to the take-up shaft even through the film winding pawl is used and sometimes the automatic winding cannot be achieved. On the other hand, if the film of ANSI type which has no leader tape is used and if it has a winding curl opposite to the direction of winding on its leading end, the advancing property in the opposite direction is strong so that the film leading end may not easily come into contact with the take-up shaft of the take-up reel. Accordingly, this may provide a problem similar to that of the M type.

SUMMARY OF THE INVENTION

A main object of the invention is to provide a roll film carrier wherein film cartridges of different types may be used without troublesome works such as exchanges of parts necessary to allow use of each type of film cartridge.

Another object of the invention is to provide a roll film carrier wherein the leading ends of films in film cartridges of different types can be fed out safely and securely.

A further object of the invention is to provide a roll film carrier wherein films of different types fed out of film cartridges of different types can be wound on a take-up reel rapidly and securely.

Still another object of the invention is to provide a roll film carrier wherein films different in widths and fed out of film cartridges of different types can be accurately regulated in the width direction position using a simple construction.

In order to attain the above objects, a roll film carrier for a reader or a reader printer as an embodiment of the invention comprises a first type film cassette and a second type film cassette each of which is detachable and different in connection means between a drive source and a reel in each of said cartridges, a first reel drive means for driving the reel within the first type film cartridge; a second reel drive means for driving the reel within the second type film cartridge; and said connection means connecting the first or second reel drive means to the reel of the installed film cartridge selectively.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
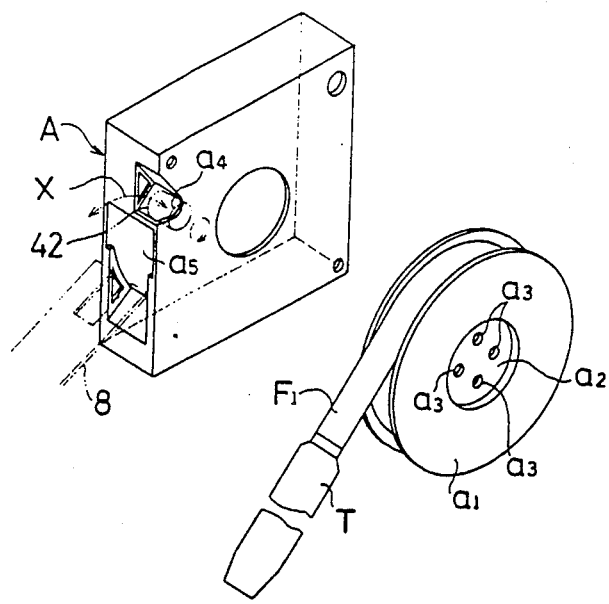
FIG. 1 is a perspective view of a conventional film cartridge of M type of the 3M company in U.S.A. illustrating the reel removed.

Before the description of the present invention proceeds, it is to be noted that like parts are designated by like reference numerals throughout the accompanying drawings.

Figure 2:
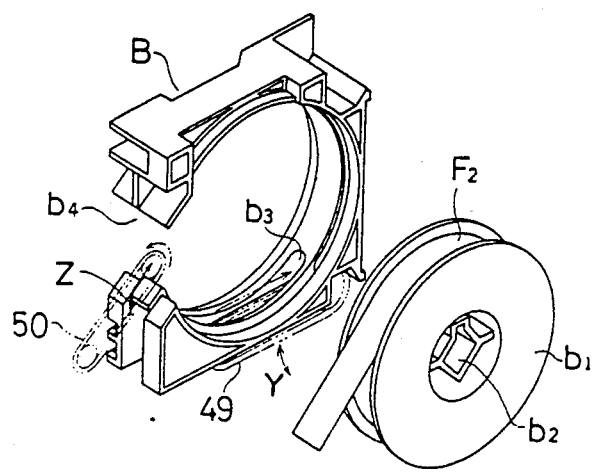
FIG. 2 is a perspective view of a conventional film cartridge of ANSI standard type illustrating the reel removed.
Figure 3:
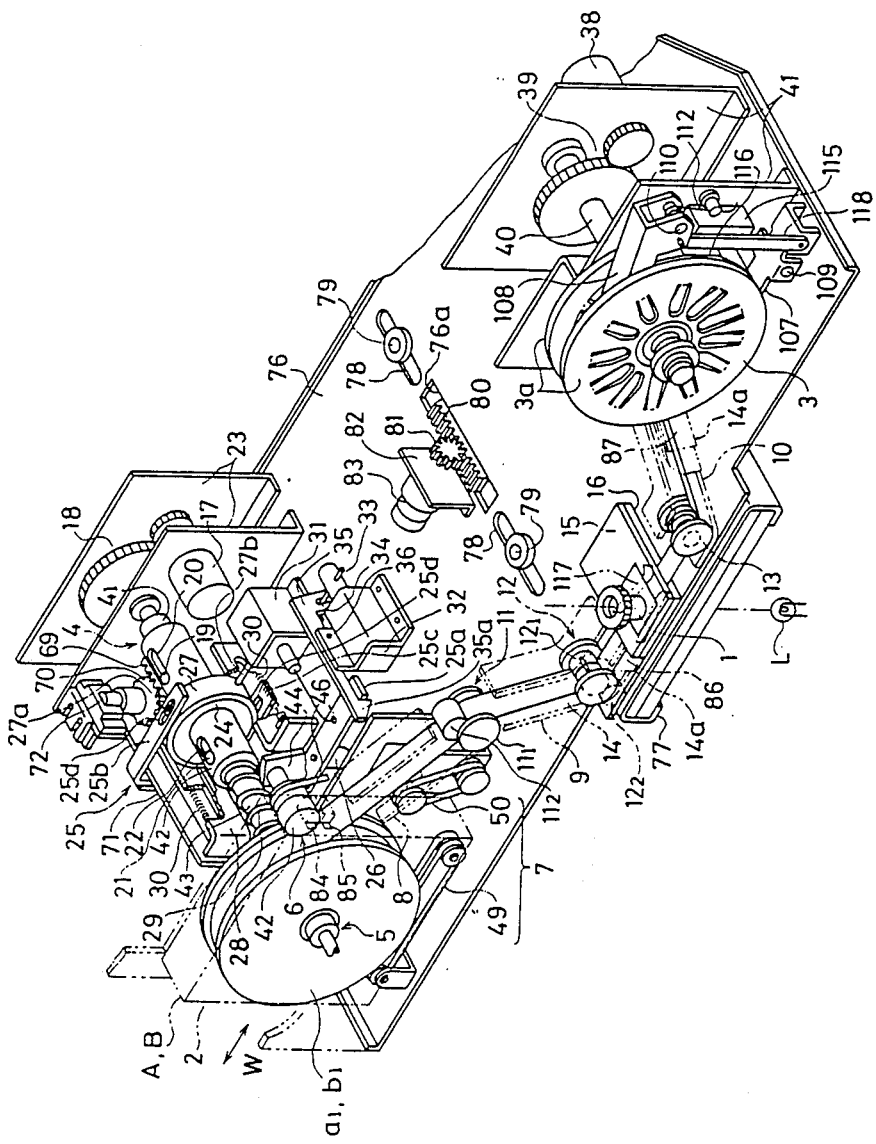
FIG. 3 is a perspective view of a roll film carrier as an embodiment of the invention illustrating substantially the overall view of the construction.

As shown in FIG. 3, a roll film carrier to be used in a reader or a reader printer for a microfilm comprises a cartridge receiving chamber 2 for a roll film cartridge A (FIG. 1) or B (FIG. 2) and a roll film take-up reel 3 both arranged respectively at lateral sides with respect to the projection position where a projection lens 1 is provided.

Figure 4:
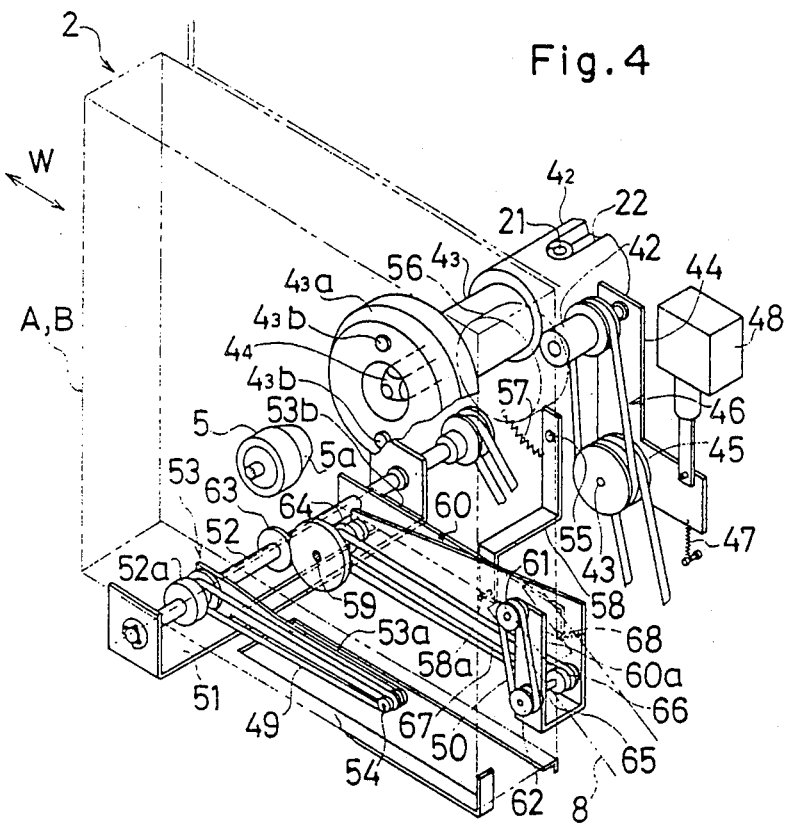
FIG. 4 is a perspective view of a film cartridge receiving chamber in FIG. 3.

The cartridge receiving chamber 2 is in a form of box where the cartridge A or B is brought in or out from the lateral side as shown by arrow W. A reel drive shaft 4 and a pressing member 5 for urging the reel against the drive shaft 4 are provided respectively at both sides of the cartridge receiving chamber 2. Leading end feeding-out mechanisms 6 and 7 of M and ANSI types for the cartridges A and B are disposed on outside of the cartridge receiving chamber (FIG. 3, FIG. 4).

Figure 12:
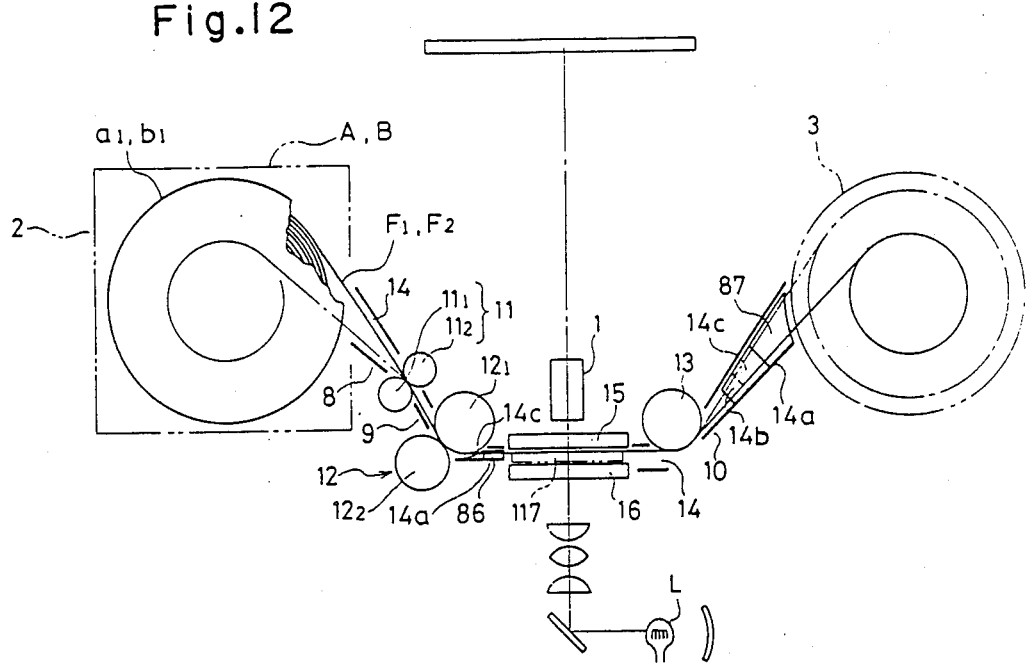
FIG. 12 is an elevational view of a film transfer path in a roll film carrier shown in FIG. 3.

Between the cartridge receiving chamber 2 and the takeup reel 3, guide plates 8, 9 and 10 and guide rollers 11, 12 and 13 shown in FIG. 12 are provided to constitute a roll film transfer path 14 passing through the projection position. Upper and lower glass plates 15, 16 for holding a microfilm therebetween and an illumination light source L for exposing the microfilm are provided at the projection position. The upper and lower glass plates 15, 16 with a limited gap between them are opened automatically or manually during the roll film loading so that the roll film $F_1$ or $F_2$ fed out of the cartridge A or B may be transported therebetween. However, even if closed,the gap is maintained to allow traveling of the roll film $F_1$ or $F_2$.

As shown in FIGS. 3 through 7, the reel drive shaft 4 is of multiple shaft structure comprising a base shaft $4_1$ in gear connection 18 to a motor 17; a cylindrical shaft body $4_2$ which is engaged to the outer circumference of the top end of the base shaft $4_1$ and movable in the axial direction for a prescribed extent with respect to the base shaft $4_1$ by guiding through the engagement of a pin 19 with an oval hole 20; an M type reel drive shaft $4_3$ for the cartridge A which is engaged to the inner circumference of the top end of the cylindrical shaft body $4_2$ and movable relatively in the axial direction for a prescribed extent with respect to the cylindrical shaft body $4_2$ by guiding throuh the engagement of a pin 21 with an oval hole 22; and an ANSI type reel drive shaft $4_4$ of square shaft which is inserted longitudinally in a round hole at the center of the drive shaft $4_3$ and provided with a rear end square shaft $4_{4a}$ disposed at rear side of a flange $4_{4b}$ for engagement with a square hole $4_{2a}$ at midway of the inner circumference of the cylindrical shaft body $4_2$ in integrally rotatable state.

Figure 8:
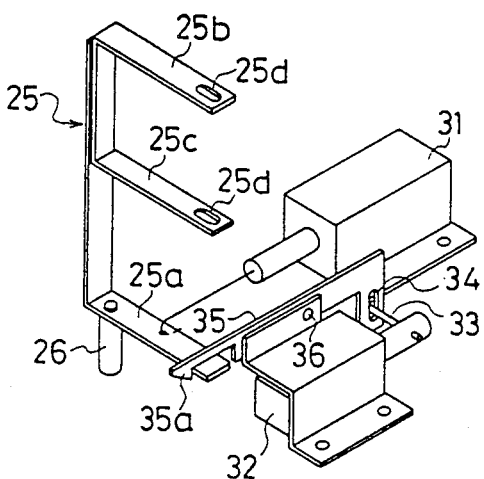
FIG. 8 is a perspective view of a reel drive shaft reciprocating mechanism in FIG. 6.

The reel drive shaft 4, with one end of the base shaft $4_1$ journaled to frames 23 together with the motor 17 and the drive shaft, is retained on a pivoting frame 25 through a bearing 24 fixed at the cylindrical shaft body $4_2$ midway thereof in the axial direction. The pivoting frame 25 is of an E-like form as shown in FIG. 8, and a lower support piece 25a is pivotally supported near the base portion by a vertical shaft 26, and midway of the cylindrical shaft body $4_2$ is retained between free ends of upper and intermediate support pieces 25b, 25c. The retaining is effected in that pins 27a projecting at two portions on the vertical diameter line at outer circumference of a ring 27 fitted to a bearing 24 on the cylindrical shaft body $4_2$ are engaged to oval holes 25d of the free ends of the upper and intermediate support pieces 25b, 25c, and the pivoting of the pivoting frame 25 about the shaft 26 reciprocates the cylindrical shaft body $4_2$ in the axial line direction.

On the top end of the M type reel drive shaft $4_3$, a flange $4_{3a}$ to be fitted into a drive shaft receiving recess $a_2$ of a reel $a_1$ in the cartridge A is provided and drive pins $4_{3b}$ are fixed at two positions on the diameter line of the front surface of the drive shaft $4_3$. While the flange $4_{3a}$ is rotated and fitted elastically to the recess $a_2$, the drive pins $4_{3b}$ are fitted to any set opposed on the diameter line among receiving holes $a_3$ bored at four positions around the center axial line on the rear wall of the recess $a_2$ so as to transmit the rotational drive force to the reel $a_1$.

The drive shaft $4_3$ is normally pressed to be at the front maximum advancing position with respect to the cylindrical body $4_2$ by means of a spring 28 acting between the flange $4_{3a}$ and the top end of the cylindrical shaft body $4_2$, and performs the elastic fitting action of the flange $4_{3a}$ to the recess $a_2$.

Figure 5:
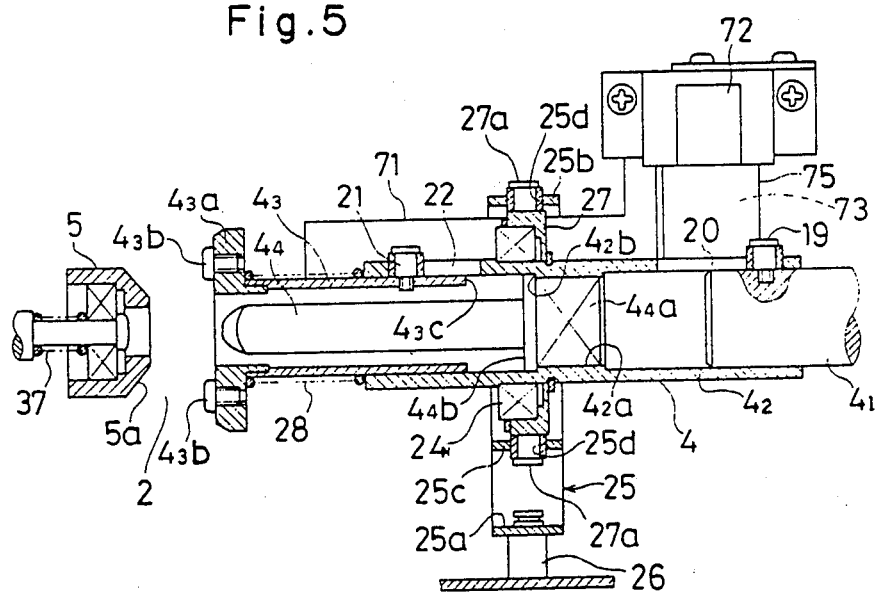
FIG. 5 is a fragmentary sectional view of a reel drive shaft in FIG. 3.
Figure 6:
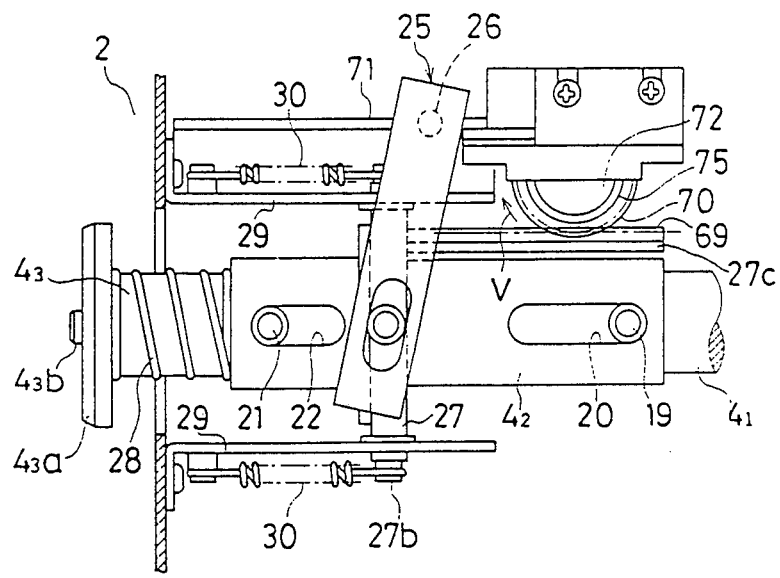
FIG. 6 is a plan view of a reel drive mechanism in FIG. 3.

On the other hand, the cylindrical shaft body $4_2$ is pressed to hold the M type reel drive shaft $4_3$ through the spring 28 to the reel drive position as shown in FIG. 5 and FIG. 6, by means of springs 30 acting between pins 27b projecting at two positions on the horizontal diameter line of outer circumference of a ring 27 and a lateral pair of turning-preventing guide fittings 29 fixed on rear side of the cartridge receiving chamber 2. A solenoid 31 is connected to the lower support piece 25a of the pivoting frame 25. If the solenoid 31 is turned on, the pivoting frame 25 is pivoted rearward to retract the cylindrical shaft body $4_2$ against the spring 30 so as to hold the drive shafts $4_3$, $4_4$ to reel non-drive positions as shown in FIG. 3. The reel non-drive position is specififed in that a stopper 35 connected to another solenoid 32 by means of fitting between a pin 33 and an oval hole 34 is engaged with the free end of the lower support piece 25a.

The stopper 35 is pivotally supported at 36 at its center, and when the pivoting frame 25 is pivoted towards the reel non-drive position, the stopper 35 is once elevated to the lower support piece 25a with the top end hook portion 35a passing and then lowered by its own weight so as to engage with the lower support piece 25a.

The ANSI type reel drive shaft $4_4$ can be projected from the flange $4_3a$ by an amount such that the top end flange $4_3a$ of the M type reel drive shaft $4_3$ is pushed against the side surface of the reel $b_1$ of the roll film cartridge B and inserted in the square hole $b_2$ of the reel $b_1$ so as to drive the reel $b_1$ sufficiently. Moreover, when the M type drive shaft $4_3$ is connected to the reel $a_1$ in a drivable state the reel drive shaft $4_4$ is not projected from the front surface of the flange $4_3a$.

Figure 10:
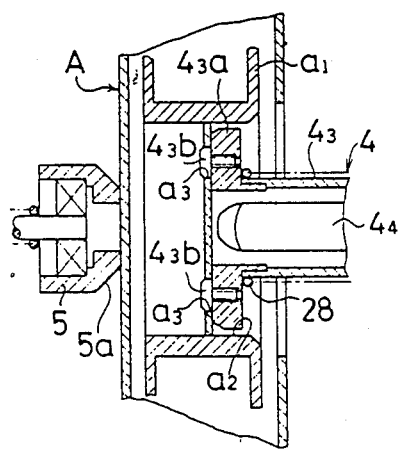
FIG. 10 is a sectional view illustrating the connection state between a reel drive shaft shown in FIG. 5 and a film cartridge of M type.
Figure 11:
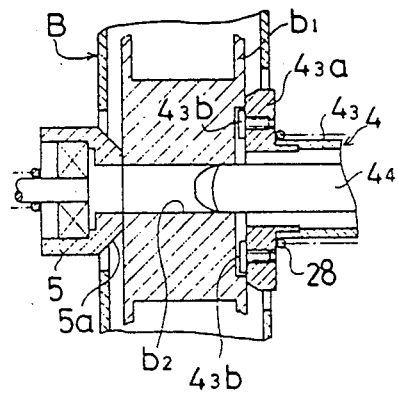
FIG. 11 is a sectional view illustrating the connection state between a reel drive shaft shown in FIG. 5 and a film cartridge of ANSI type.

The pressing member 5 is provided at the rear surface of the front wall of the cartridge receiving chamber 2 and pressed towards the reel drive shaft 4 by means of a spring 37. When the cartridge A or B is mounted, the pressing member 5 is moved rearward by receiving the pressure at the top end taper portion 5a so as to push the charged cartridge A itself or the reel $b_1$ in the cartridge B against the reel drive shaft 4 as shown in FIG. 10 or FIG. 11, respectively. As a result, the connection state between the M type reel drive shaft $4_3$ and the reel $a_1$ or between the ANSI type reel drive shaft $4_4$ and the reel $b_1$ can be secured.

The take-up reel 3 is fixed on a drive shaft 40 in gear connection 39 with a motor 38, and the drive shaft 40 together with the motor 38 is held to a frame body 41.

The M type film leading end feeding-out mechanism 6 feeds out the leader tape T on the leading end of the film $F_1$ wound on the reel $a_1$ by means of a guide roller 42 installed in a window $a_4$ of the M type film cartridge A so as to reciprocate in the direction of arrow X as shown by an imaginary line of FIG. 1. The guide roller 42 is driven by a belt transmission system 46 which is supported to one end of a bell crank type lever 44 pivotally supported by a horizontal shaft 43 and is suitably driven through an intermediate pulley 45 on the shaft 43 as shown in FIG. 4. The lever 44 is biased by a spring 47 acting at other end thereof so that the guide roller 42 is normally disposed at the standby position outside the window $a_4$. The guide roller 42 is also forced to the inside of the window $a_4$, against the bias of the spring 47, by action of a solenoid 48 connected to the other end of the lever 44.

The ANSI type film leading end feeding-out mechanism 7 feeds out the leading end of the film $F_2$ wound on the reel $b_1$ by a drive belt 49 movable in the direction of arrow Y with respect to an oval hole $b_3$ on the bottom of the ANSI type film cartridge B and by a guide belt 50 movable in the direction of arrow Z with respect to a film feeding-out port $b_4$ at the front side of the cartridge B as shown by the imaginary line of FIG. 2.

The drive belt 49 is driven for rotation at a suitable time by a drive source (not shown) and stretched between a pulley 52a on a lateral installed drive shaft 52 supported by a frame 51 and a pulley 54 on the top end of a working arm 53a of a forked support lever 53 with the base portion pivotally supported by the drive shaft 52. A driven arm 53b of the forked support lever 53 is received by a rocking pin 58a on the lower end of a rocking lever 58 which has upper end supported by shaft 55 and is connected by a rotary solenoid 56 and a spring 57. The forked support lever 53 is elevated by the pin 58a when the solenoid 56 is turned on, and lowered when the solenoid 56 is turned off, thereby the drive belt 49 is moved into or out of the oval hole $b_3$.

The guide belt 50 is stretched between upper and lower pulleys 61, 62 on the outside of a U-like turned upward piece 60a at the top end of a support lever 60 with the base end pivotally supported by a shaft 59 projecting from the rear wall of the cartridge receiving chamber 2. A pulley 64 connected in gear connection 63 with the drive shaft 52 is rotatably installed on the shaft 59. A belt 67 is stretched between a driven pulley 66 installed on a rotary shaft 65 of the pulley 62 within the U-like portion at the top end of the support lever 60 and the pulley 64. The guide belt 50 is driven simultaneously together with the drive belt 49 by the drive belt 52. The support lever 60 is connected by the driven arm 53b of the forked support lever 53 and a spring 68. As the forked support lever 53 moves the drive belt 49 into or out of the oval hole $b_3$, the guide belt 50 is simultaneously moved into or out of the film feeding-out port b.

A rack 69 is positioned on one side of the rear portion of the cylindrical shaft body 42 in a fixed state relative to the ring 27, and a pinion 70 to be meshed with the rack 69 is connected to a damper 72 on a support plate 71 through a one-way clutch 73.

Figure 7:
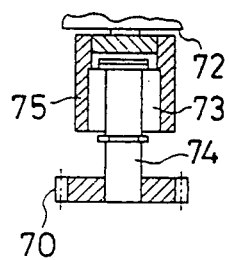
FIG. 7 is a sectional view of a damper mechanism in FIG. 5.

The one-way clutch 73 is interposed between a shaft 74 of the pinion 70 and a housing 75 connected to the damper 72 as shown in FIG. 7. The damper 72 limits the rotation of the housing 75 connected thereto to low speed. The one-way clutch 73 performs the connection between the shaft 74 and the housing 75 to the rotation of the pinion 70 (direction of arrow V) when the cylindrical shaft body 42 is advanced towards the reel drive position, and suppresses the advancing speed of the cylindrical shaft body 42 by means of the damper 72. At the reverse movement, the one-way clutch 73 releases the connection between the shaft 74 and the housing 75 so that the damper 72 does not affect to the rearward movement of the cylindrical shaft body 42.

A bed plate 76, on which the roll film carrier is installed, is held to a base 77 by means of guide of fitting between an oval hole 78 and a pin 79 so that it is moved forward and rearward with respect to an optical system. A rack 80 fixed to the base 77 is faced on the bed plate 76 through a window 76a of the bed plate 76, and is meshed with a pinion 81 installed on the bed plate 76. The pinion 81 is connected directly to a motor 83 mounted to a frame 82 on the bed plate 76. The bed plate 76 is moved forward and rearward by drive of the motor 83 so that positions of the roll films $F_1$ and $F_2$ at front and rear sides of the projection member can be adjusted.

Figure 9:
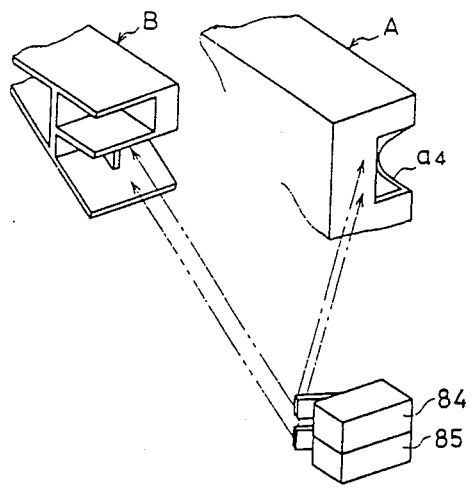
FIG. 9 is a perspective view illustrating the relation of a cartridge type detection switch in FIG. 3 and film cartridges of each type.

A vertical pair of cartridge detecting switches 84, 85 are installed within the cartridge receiving chamber 2 as shown in the imaginary line of FIG. 3. The cartridge detecting switches 84, 85 are opposed to the cartridges A, B to be charged as shown by the single dot line and double dot line of FIG. 9. The upper switch 84 is pushed by the charging of either cartridge A or B and detects the charging of the cartridge A or B, whereas the lower switch 85 is pushed by the charging of only the cartridge A and can detect the type of the charged cartridge on the basis of whether or not the switch 85 is pushed when the switch 84 is pushed.

Figure 13:
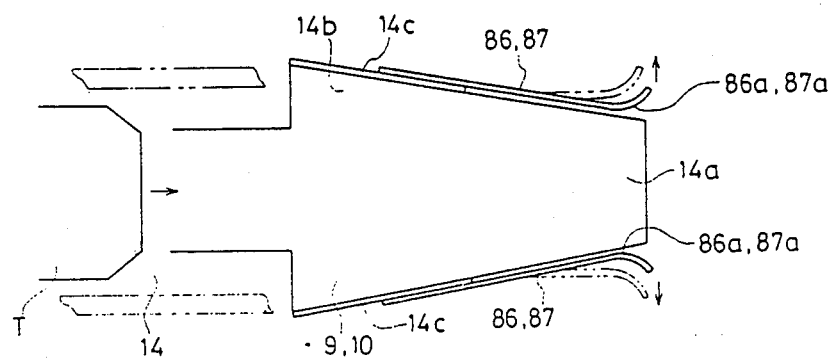
FIG. 13 is a plan view of a film transfer contraction member in FIG. 3.
Figure 14:
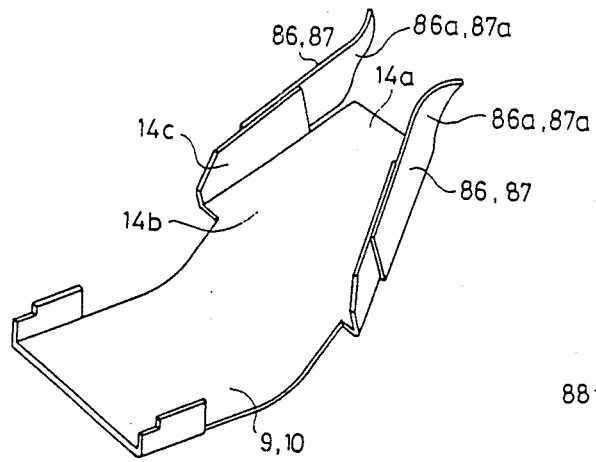
FIG. 14 is a perspective view of a film transfer contraction member in FIG. 3.

Even when both films $F_1$ and $F_2$ are of the same 16 mm film, the leader tape T provided on the film $F_1$ is 20.5 mm in width and therefore the leading end portion of the film $F_1$ becomes wider. In the transfer path 14 commonly used for both films $F_1$, $F_2$ as shown in FIG. 12, FIG. 13 and FIG. 14, the leader tape T of the film $F_1$ can pass easily. In order to transfer the ordinary width portion of film $F_1$ and the whole film $F_2$ without oscillation, particularly at the projection position, contraction guides 86, 87 are provided on front and rear sides of the projection position of the transfer path 14. These guides are designed to elastically hold the film at its minimum width at the narrowest portion 14a of the transfer path.

The guides 86, 87 are provided as extension elastic tongues in the film taking traveling direction to the side plates 14c to constitute the contraction transfer path 14b with the transfer path width gradually decreased at the film taking traveling direction of the guide pair 9, 10. The top end portions of the guides 86, 87 are made circular arc guide portions 86a, 87a of inward convex form without hooking in the film width variation in both transfer directions at the film taking and rewinding, and the minimum transfer path width is normally held.

Figure 16:
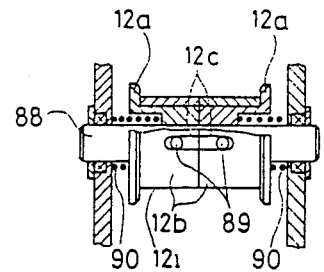
FIG. 16 is a sectional view of a guide roller with variable dimension between flanges in FIG. 15.
Figure 15:
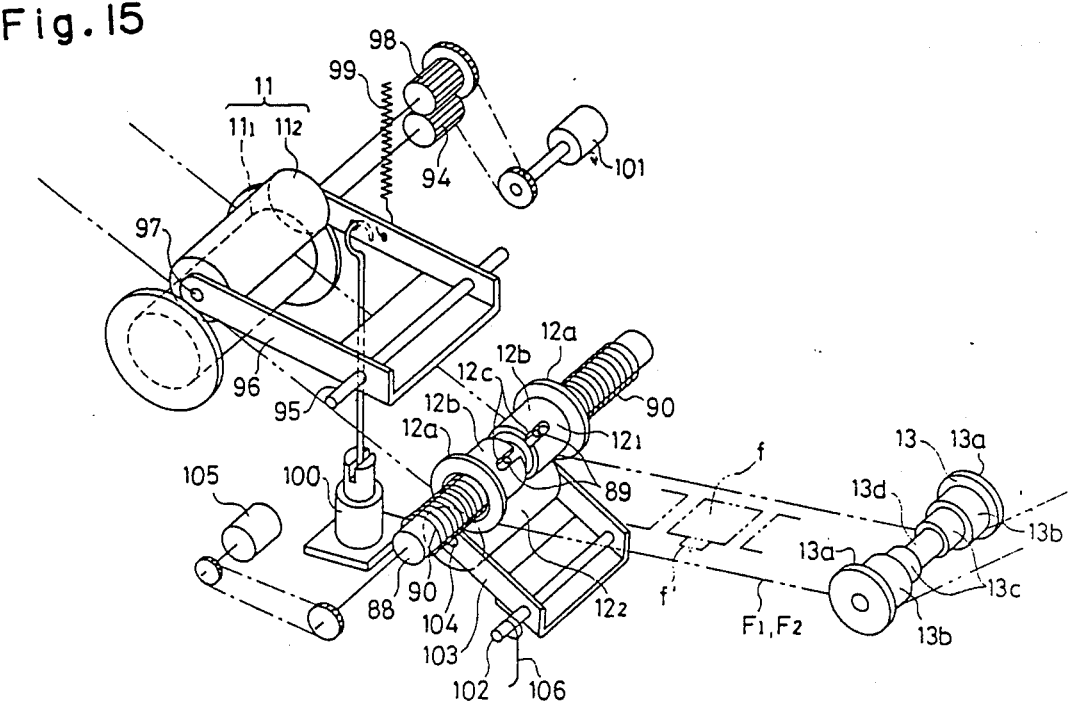
FIG. 15 is a perspective view of a guide roller group ih a part of the film transfer path in FIG. 12.

Corresponding to the transfer contraction of the guides 86, 87, the upper roller $12_1$ of the guide roller pair 12 and the take-up reel 3 made variable in distance between flanges, and the guide roller 13 is made a stepped roller. As shown in FIG. 15 and FIG. 16, the upper guide roller $12_1$ is installed to a support shaft 88 in a movable state in the axial direction by means of a half-size guide shaft 12b with a single flange 12a by the oval hole 12c and a pin 89. The dimension between both flanges 12a is normally held in a state to produce the minimum value $16+0.1\sim0.2$ mm corresponding to the minimum film width 16 mm by means of biasing of the springs 90 from both sides. To the leader tape T of the film F1, the flanges 12a are pushed to both sides by the tape T thereby the lateral guide shafts 12b are separated, and dimension between the flanges 12a is enlarged uniformly at forward and rear sides to the leader tape width with respect to the neutral position corresponding to the projection optical axis.

Figure 18:
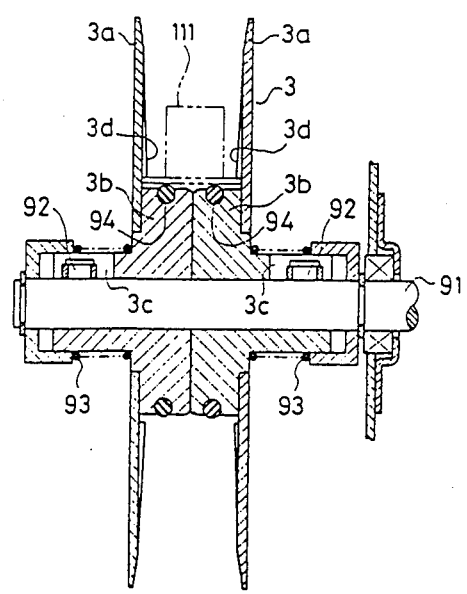
FIG. 18 is a sectional view of a film take-up mechanism in FIG. 3 taken in the axial direction.

As shown in FIG. 18, the take-up reel 3 is installed to a support shaft 91 so that the half-size take-up shaft 3b with the single flange 3b is movable in the axial direction by means of guide of the oval hole 3c and a pin 92. The dimension between both flanges 3a is normally held in a state to produce the minimum value $16+0.1\sim0.2$ mm corresponding to the minimum film width 16 mm by means of biasing of springs 93 from both sides. Adjustment of the dimension between the flanges 3a to the film is similar to the case of the upper guide roller $12_1$.

Figure 19:
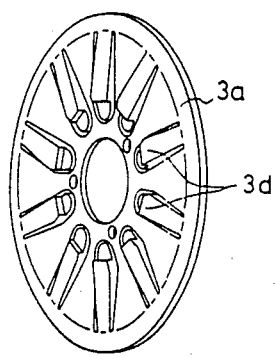
FIG. 19 is a perspective view of a flange of the take-up reel in FIG. 17, FIG. 18.
Figure 20:
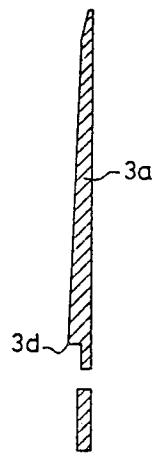
FIG. 20 is a longitudinal sectional view of a pawl of the flange in FIG. 19.
Figure 21:
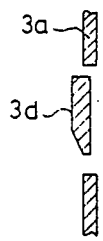
FIG. 21 is a transverse sectional view of a pawl of the flange in FIG. 19.

As shown in FIG. 19, FIG. 20 and FIG. 21, the take-up reel 3 is also provided with a number of film winding pawls 3d which are arranged in radial directions to both flanges 3a and have the free ends at centripetal side projecting to the inside of the flange 3a and are opposed to the outer circumference of the take-up shaft 3b. The leading end of the automatically supplied film F1 or F2 is advanced thereby dimension between both flanges 3a is enlarged to that corresponding to the width at the leading end of the film, so that the leading end of the supplied film is easily received irrespective of the width. Since the leading end of the advanced film is hooked in entered state to inside of both lateral pawls at the inner surface of both flanges 3a, the leading end of the film is held between friction rings 94 made of rubber or the like and wound on the outer circumference of the take-up shaft 3b as shown in imaginary line of FIG. 18, and then the film is wound onto the take-up shaft 3b.

As shown in FIG. 15, the guide roller 13 is provided with both flanges 13a, the maximum width guide circumferential surfaces as maximum diameter outer circumferential surfaces 13b formed on both ends between both flanges 13a for guiding the wide leader tape T, intermediate diameter outer circumferential surfaces 13c formed at inside of the outer circumferential surfaces 13b for guiding the ordinary width portion of the film $F_1$ and the whole film $F_2$, and minimum outer circumferential surface 13d formed at the center portion for providing relief to the films $F_1$, $F_2$.

The guide roller pair 11 comprises a stationary lower roller $11_1$ with a driven gear 94, and an upper roller $11_2$ with a drive gear 98 supported by shaft 97 at the top end of a lever frame 96 pivotally supported 95. The lever frame 96 is biased upward by means of a spring 99 so that the upper roller $11_2$ is normally separated from the lower roller 111 and also the drive gear 98 is separated from the driven gear 94. A solenoid 100 is connected to the lever frame 96. Only when the leading end of the automatically supplied film is other than the leader tape T being strong, the solenoid 100 is operated, thereby the upper roller $11_2$ is pushed to the lower roller $11_1$ against the spring 99, and the drive gear 98 is meshed with the driven gear 94. The upper roller $11_2$ driven by a motor 101 and the lower roller $11_1$ driven by the pushing of the upper roller 112 through the gears 94, 98 apply the transfer force to the leading end of the automatically supplied film being weak, thereby the traveling property of the automatically supplied film in the transfer path, particularly the entering and passing property to each guide member at the projection position, can be improved.

The guide roller pair 12 comprises a lower roller $12_2$ supported by shaft 104 to the top end of a lever frame 103 pivotally supported 104, and an upper roller 121 with variable dimension between the flanges connected to an encoder 105. The lower roller $12_2$ is pushed to the upper roller $12_1$ by a spring 106 acting on the lever frame 103, thereby the automatically supplied film is charged and guided irrespective of whether or not the leader tape T exists, and fed securely between the upper and lower glasses 15, 16 at the projection position.

Figure 17:
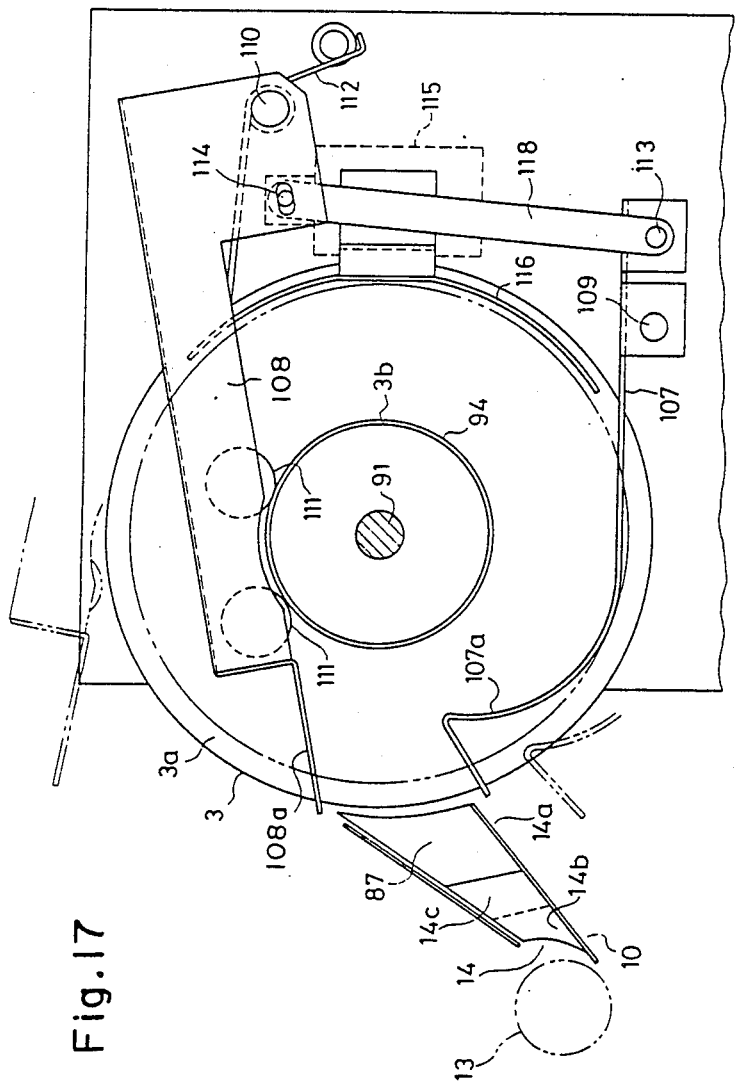
FIG. 17 is a sectional view of a film take-up mechanism in FIG. 3 taken in perpendicular direction to the axial direction.

As shown in FIG. 17, around the take-up reel 3 is installed a film top end guide member 107 which guides the leading end of the automatically supplied film to the take-up reel onto the take-up shaft 3b, and also a film pushing member 108 which acts on the leading end of the automatically supplied film prior to the guide member 107 and pushes it to the take-up shaft 3b.

The film leading end guide member 107 is laterally installed to the lower side of the take-up reel 3, and a leading end film guide member 107a has circular curve form approaching with the circular arc inner surface to the take-up shaft 3b by means of a lever member with the rear end side supported by shaft 109. The guide portion 107a is moved in or out between the flanges 3a of the take-up reel 3 by the vertical rocking of the guide member 107 about the shaft 109, and separated from or contacted with the take-up shaft 3b.

The film pushing member 108 is laterally installed to the upper side of the take-up reel 3. The rear end side of the film pushing member 108 is supported by shaft 110, and the top end portion thereof can be entered between both flanges 3a of the take-up reel. Pushing rollers 111 for pushing the automatically supplied film to the take-up shaft 3b are rotatably installed to the top end portion of the pushing member 108 on two positions at front and rear sides, and normally separated from the take-up shaft 3b by means of biasing of a spring 112 acting on the member 108. A guide piece 108a for guiding the leading end of the automatically supplied film between the rollers 111 and the take-up shaft 3a is extended forward from the installing position of the rollers 111 on the member 108.

The film leading end guide member 107 and the film pushing member 108 are connected in pin connection 113, 114 using a link 118 between lateral side of the rear end side of the pivotally supporting portion and lateral side of the top end side of the pivotally supporting portion. A solenoid 115 is connected to the connecting pin 114 at the film pushing member side. The solenoid 115 pushes the film pushing member 108 to the take-up shaft 3b against biasing of the spring 112 at the working state, and moves the guide portion 107a of the film leading end guide member 107 through the link 118 to the working position near the take-up shaft 3b.

A circular arc guide 116 positioned outside the film taking region between the flanges 3a is provided on the rear side of the take-up reel 3. When the film leading end passes between the film pushing member 108 and the take-up shaft 3b and is still apt to travel straight without being wound onto the take-up shaft 3b, the circular arc guide 116 guides the film leading end towards the film leading end guide member 107 so as to secure the guide of the member 107.

Series of operations will now be described. If the film cartridge A or B is charged in the cartridge receiving chamber 2 to the imaginary line position of FIG. 3, FIG. 4, either of the cartridge detecting switches 84, 85 provided at the cartridge receiving chamber 2 is actuated to identify whether the charged cartridge is A or B. The microcomputer for operation control receives signals from the switches 84, 85, and discriminates the type of the charged cartridge and starts the loading operation of the roll film.

During the operation, the solenoid 32 shown in FIG. 3 and FIG. 8 is turned on, and disengages the stopper 35 from the lower support piece 25a of the pivoting frame 25 thereby the pivoting frame 25 is pivotable freely. If the pivoting frame 25 is made free, the cylindrical shaft body $4_2$ in the reel drive shaft 4 pivots the pivoting frame 25 by biasing of both springs 30 acting on the cylindrical shaft body $4_2$ and function of the damper 72 and is pushed at the low speed state from the base shaft $4_1$, thereby the M type reel drive shaft $4_3$ is moved at low speed through the spring 28 to the advancing position. Accompanying with this, the ANSI type reel drive shaft $4_4$ is also moved forward to the drive prescribed advancing position.

The reel drive shaft $4_3$, $4_4$ of respective types are moved forward at low speed, and at the same time these are rotated at low speed in reverse direction to the film feeding-out direction by turning the motor 17 on and pushed slowly to the cartridge A or B charged and pushed by the pressing member 5 during the rotation at low speed.

When the cartridge A is charged, the top end flange $4_3a$ of the drive shaft $4_3$ is fitted to the recess $a_2$ of the reel $a_1$ enclosed in the cartridge A, thereby the drive pin $4_3b$ is press moved in circle to the rear wall of the recess $a_2$ to fit into one set of the receiving holes $a_3$ as shown in FIG. 10 so as to constitute the connection state.

When the cartridge B is charged, the top end flange $4_3a$ of the drive shaft $4_3$ abuts on the end surface of the reel $b_1$ enclosed in the cartridge B as shown in FIG. 11 and further movement of the drive shaft $4_3$ is inhibited, whereas the drive shaft $4_4$ is further moved forward by the cylindrical shaft body $4_2$ beyond the flange $4_3a$ and press rotated on an opening of the square hole $b_2$ of the reel $b_1$ to fit into the square hole $b_2$ so as to constitute the connection state.

Thus the drive shafts $4_3$, $4_4$ corresponding to the types of the charged cartridges are selectively used automatically by forward movement at low speed and rotation at low speed of these shafts occurs without abrasion of a pressure fitting portion or mutual cutting or damage of the film by fine powders, and the roll film $F_1$ or $F_2$ is at once tightened.

The tightening of the film $F_1$ or $F_2$ is performed for a predetermined time, and the film $F_1$ or $F_2$ for next film feeding-out drive is tightened suitably and the slack is eliminated. The motor 17 is turned off after the film is tightened.

When discrimination of the type of the charged cartridge is M type cartridge A, the solenoid 48 of the M type roll film leading end feeding-out mechanism 6 is turned on and the guide roller 42 of the mechanism 6 is entered in the window $a_4$ of the cartridge A thereby the leading end feeding-out of the film $F_1$ is made possible.

When discrimination of the type of the charged cartridge is ANSI type cartridge B, the rotary solenoid 56 of the ANSI type roll film leading end feeding-out mechanism 7 is turned on, and the drive belt 49 of the mechanism 7 and the guide belt 50 are entered into the oval hole $b_3$ of the cartridge B and the film feeding-out port $b_4$ thereby the leading end feeding-out of the film $F_2$ is made possible.

When the film leading end feeding-out mechanism 6 or 7 comes to the operable position, the guide roller 42 and the drive and guide belts 49, 50 are driven by action of the clutch or the motor. In this case, rotation of the drive shaft 4 is made free.

When the cartridge A is charged, the film $F_1$ once tightened is supplied with the film feeding-out rotation by the guide roller 42. This rotation is efficiently transmitted to the leading end of the film $F_1$, and since the leading end of the film $F_1$ has a wide leader tape T of strong material and directed towards the film feeding-out port $a_5$ for straight advance to outside of the film winding, it can be fed to the feeding-out port $a_5$ reasonably and securely. In this case, the film leading end feeding-out mechanism 7 is moved rearward to the non-working position and does not affect to the leading end feeding-out of the film F1.

When the cartridge B is charged, the film $F_2$ once tightened is supplied with film feeding-out rotation by the belt 49. Although this rotation is efficiently transmitted to the leading end of the film $F_2$, since the leading end of the film $F_2$ has no leader tape for drawing and therefore is weak, response property is slightly bad in comparison to the film $F_1$. However, since the drive belt 49 of the mechanism 7 is contacted to the outer circumferential portion of film winding to the leading end of the film $F_2$ and rotated in the film feeding-out direction, the leading end of the film $F_2$ is directed in the cartridge B to the film feeding-out port $b_4$ rapidly and securely. Even if the leading end of the film $F_2$ attains to the feeding-out port $b_4$, since the film $F_2$ is weak and therefore the outer traveling property to outside of the film winding is low, it is not apt to go away from the outer circumferential portion of film winding but is kicked out of the feeding-out port $b_4$ by the guide belt 50 facing to the lower side of the film feeding-out port $b_4$. In this case, the other film leading end feeding-out mechanism 6 is moved rearward to the non-working position and does not affect the feeding-out of the leading end of the film $F_2$.

The leading end of the film $F_1$ or $F_2$ fed out of the charged cartrige A or B rides on the guide plate 8, and passes through the transfer path 14 by continuation of the film feeding-out drive by driving the reel $a_1$ or $b_1$ and then attains to the take-up reel 3. In this case, the guide roller pair 11 is pushed to grasp and transfer the film $F_2$ which does not have the leader tape at the leading end and therefore is bad in the traveling property, thereby feeding of the film, $F_2$ to the take-up reel 3 is achieved securely. The roller pair 11 is spaced to the film $F_1$ which has the leader tape T at the leading end and therefore is good in the traveling property. In this constitution, the leader tape T is only roughly guided but moved through the transfer path 14 smoothly and attains to the take-up reel 3 so that fatigue or weakening caused by the grasping of the roller pair 11 can be avoided.

The guide roller pair 12 prior to the projection position of the transfer path receives the leading end of the film $F_1$ or $F_2$ passing through the roller pair 11, and guides it in driven rotation through the transfer contraction portion 14a of the guide pair 9 and introduces it between the upper and lower glass plates 15, 16 at the projection position. The supplied film $F_1$ or $F_2$ left between the upper and lower glass plates 15, 16 passes around the guide roller 13, through the guide pair 10 and the transfer contraction portion 14a and attains to the take-up reel 3.

The transfer contraction portion 14a and the upper guide roller 12 at both sides of the projection position are enlarged uniformly at front and rear sides of the position corresponding to the optical axis when the leader tape T of the film $F_1$ is supplied automatically, thereby the leader tape T passes smoothly without shifting of the width direction center position or oscillation, and the guide roller 13 performs the oscillation preventing of the leader tape T by means of guide of the flange 13a at the maximum diameter outer circumferential surface 13b. When the leader tape T is finished to pass, the transfer contraction portion 14a and the upper guide roller $12_1$ are restored to the initial state and the ordinary width portion of the film $F_1$ is continuously guided without shifting of the width direction center position, and the guide roller 13 drops the ordinary width portion of the film $F_1$ into the intermediate diameter outer circumferential surface 13c and performs the oscillation preventing utilizing the stepped portion to the maximum diameter circumferential surface 13b. In the case of the film $F_2$ without the leader tape, the same guide as that of the ordinary width portion of the film $F_1$ is performed from the initial state.

In this constitution, the film $F_1$ or $F_2$ irrespective of whether or not the leader tape T exists, without shifting in the width direction center position, passes through the film transfer path at the projection position and attains to the take-up reel 3 smoothly.

The supplied film attains to the guide roller pair 11 and the upper roller $11_2$ is driven and rotated thereby the encoder 105 (FIG. 15) is started, and the motor 38 is operated, thereby the take-up reel 3 is driven for rotation at higher speed than the film supply speed and the film is fed to the take-up reel 3 during rotation. In addition to the rotation drive of the take-up reel 3, when the solenoid 115 is turned on, the film pushing member 108 and the film leading end guide member 107 are moved against the biasing of the spring 112 in solid line working position of FIG. 17.

When the film fed to the take-up reel 3, which is rotated to the state of the solid line of FIG. 17, is the film $F_1$ having the leader tape T, the leader tape T enlarges the distance between both flanges 3a of the take-up reel 3 uniformly at front and rear sides of the position corresponding to the projection optical axis, and travels between the film pushing member leading end guide piece 108a within the reel 3 and the take-up shaft 3b. The leader tape T is pushed to the take-up shaft 3b by the pushing roller 111 at rear side of the guide piece 108a and the leading end thereof is hooked to the film winding pawl 3d of the flange 3a thereby the leader tape T is held with friction between the pawl and the friction ring 94 on outside of the take-up shaft 3b. If the friction holding state is held longer than one rotation of the take-up reel 3, the leader tape T is wound onto the take-up shaft 3b thereby the automatic winding is achieved. However, thickness of the leader tape T is 7 mil to 10 mil and several times as large as that of the ordinary portion of the film $F_1$ or the film $F_2$ being 2.5 mil to 5 mil. Consequently, the leader tape T is strong in comparison to the latter, and therefore has the straight traveling property. Even if the leader tape T is once held with friction between the pawl 3d and the take-up shaft 3b, the leader tape T is apt to travel straight and may detach the friction holding and not be wound onto the take-up shaft 3b.

The leading end of the leader tape T which is not wound thereto is apt to travel straight between the take-up shaft 3b and the pushing roller 111, and impinges on the circular arc guide 116 and is guided towards the film leading end guide member 107. Thereby the leading end of the tape T travels along the member 107, and is guided by the final guide of the leading end film guide portion 107a and directed again between the take-up shaft 3a and the tape T subsequently pushed by the pushing roller 111. When the leading end of the leader tape T attains to position between both, it receives the pushing by the roller 111 through the subsequently pushed tape T. Then the leading end of the tape T is again engaged with the pawl 3d and held with friction between the pawl and the friction ring 94 at outside of the take-up shaft 3b. The friction holding is performed under the subsequent portion of the tape T which is pushed to the take-up shaft 3b subsequently after the leading end and wound thereto. That is, the friction holding is performed in condition that the straight traveling property of the leading end of the tape T is significantly limited. Accordingly, the friction holding of the leading end of the tape T is secured, and difference of friction between the friction ring 94 and the tape T and friction of the tape T with each other enables the automatic winding of the leading end of the tape T onto the take-up shaft 3b and the subsequent automatic winding.

The film $F_2$ without leader tape can be naturally received by the take-up reel 3, and the automatic loading is achieved almost securely in the friction holding when the film is first pushed to the take-up shaft 3b by the pushing roller 111. Even if the leading end of the film $F_2$ is not wound automatically at the first pushing to the take-up shaft 3b in such reason that the leading end of the film has habit of turning in reverse direction to that at the film winding side or the leading end is curled, when the friction holding is performed again by guide of the film leading end guide 108, the automatic winding is achieved more securely than the case of the leader tape T because the film $F_2$ is weak.

The film $F_1$ or $F_2$ is wound onto the take-up reel 3 to a definite amount, and when the count number of pulse signals from the encoder 105 attains to the definite value, the motors 17 and 38 are turned off and the film leading end feeding-out mechanism 6 or 7 operated corresponding to the charged cartridge A or B is stopped and reset to the non-working position.

Thus the loading operation of the film is finished.

Next, according to selective drive of the motors 17 and 38, the film $F_1$ or $F_2$ after loading is taken or rewound and a prescribed frame is brought to the projection position so that the prescribed frame is read or printed.

As shown in FIG. 15, retrieval of the prescribed frame is performed by reading a frame mark f' corresponding to each frame f. In order to read the mark accurately, width direction position accuracy in the transfer path 14 of the film $F_1$ or $F_2$ becomes a problem. In this constitution, the contraction guides 86, 87 as the widenable transfer contraction portion 14a can be windened corresponding to the wide leader tape T, and moreover the ordinary portion of the film $F_1$ and the whole film $F_2$ can be held always to the definite width direction center position of the basis of own elasticity and moved in the transfer path 14 without oscillation, thereby the frame mark f' can be read accurately.

In order to perform the width direction positioning of the films $F_1$, $F_2$ accurately, the transfer contraction portion 14a is preferably formed at plural positions of the transfer path 14. For example, as shown in imaginary line of FIG. 3 and FIG. 12, an elastic guide piece 117 may be arranged between the upper and lower glass plates 15, 16 of the film path at lateral sides of the projection position.

In order to detach the charged cartridge A or B, the film $F_1$ or $F_2$ is first removed, and after the rewinding is finished, the drive shaft 4 is moved rearward. Then the solenoid 48 is turned on thereby the M type film feeding-out roller 42 is moved to the working position. The movement of the roller 42 pushes the cartridge B itself or the reel a within the cartridge A or the rewound film $F_1$, thereby the charged cartridge A or B is pushed out of the cartridge receiving chamber 2 automatically and suitably. The automatic pushing may be performed so that the cartridge A or B does not fall out by the pushing. The rearward movement of the drive shaft may be performed simultaneously with the movement of the roller 42 to the working position or later.

In the embodiment, the reel drive shaft $4_3$ and the reel drive shaft $4_4$ are constituted in multiple-shaft form, but not limited to his. Otherwise, each of the reel drive shafts $4_3$, $4_4$ may be individually moved forward and rearward.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A roll film carrier for a reader or a reader printer comprising:

cartridge holding means for holding either of a first type cartridge and a second type cartridge selectively at the same position, the shape of the first type cartridge being different from that of the second type cartridge;

detecting means for detecting whether either of the cartridges is mounted in the cartridge holding means;

judging means for judging the type of cartridge mounted to the cartridge holding means;

first feed-out means moveable between an operative position to feed a film from the first type cartridge into a transfer path and an inoperative position;

second feed-out means moveable between an operative position to feed a film from the second type cartridge into the transfer path and an inoperative position;

first control means for setting either of the first and second feed-out means in the operative position based on a signal from the judging means; and second control means for operating the feed-out means which is in the operative position based on a signal from the detecting means.

2. A roll film carrier as claimed in claim 1 further comprising:

a first reel drive shaft moveable in an axial direction for transferring drive force to a reel in the first type cartridge;

a second reel drive shaft coaxial with and moveable relative to the first reel drive shaft for transferring drive force to a reel in the second type cartridge;

urging means for urging the second reel drive shaft to an extended position where an end of the second reel drive shaft extends from that of the first reel drive shaft; and third control means for inserting the first and second reel shafts into the mounted cartridge based on a signal from the detecting means.

3. A roll film carrier as claimed in claim 1, further comprising:

a take-up reel for taking up the film transferred from the mounted cartridge through a transmission path;

a guide means for guiding the leading end of the film towards a neighboring region of a shaft of the take-up reel, said film being transferred from the transfer path to the take-up reel; and a moveable means for moving the guide means between a position close to the shaft of the take-up reel and a position on the outside of a take-up diameter of the take-up reel.

4. A roll film carrier as claimed in claim 1, further comprising:
   a transfer path contraction means for enabling variation of the path width corresponding to the width dimension of the passing film and provided at a midway point of a transfer path to transfer the roll film fed out of the cartridge to a take-up reel.

5. A roll film carrier for a reader or a reader printer comprising:
   cartridge holding means for holding either of a first type cartridge and a second type cartridge selectively at the same position, the shape of the first type cartridge being different from that of the second type cartridge;
   detecting means for detecting whether either of the cartridges is mounted in the cartridge holding means;
   a first reel drvie shaft moveable in an axial direction for transferring a drive force to a reel in the first type cartridge;
   a second reel drive shaft provided coaxial with and moveable relative to the first reel drive shaft for transferring a drive force to a reel in the second type cartridge;
   urging means for urging the second reel drive shaft to an extended position where an end of the second reel drive shaft extends from that of the first reel drive shaft; and
   control means for inserting the first and second reel shafts into the mounted cartridge based on a signal from the detecting means.

6. A roll film carrier as claimed in claim 5, further comprising:
   a take-up reel for taking up the film transferred from the mounted cartridge through a transmission path;
   a guide means for guiding the leading end of the film towards a neighboring region of a shaft of the take-up reel, said film being transferred from the transfer path to the take-up reel; and
   a moveable means for moving the guide means between a position close to the shaft of the take-up reel and a position on the outside of a take-up diameter of the take-up reel.

7. A roll film carrier as claimed in claim 5, further comprising:
   a transfer path contraction means for enabling variation of the path width corresponding to the width dimension of the passing film and provided at a midway point of a transfer path to transfer the roll film fed out of the cartrdige to a take-up reel.

* * * * *